United States Patent
Xu et al.

(10) Patent No.: US 10,417,979 B2
(45) Date of Patent: Sep. 17, 2019

(54) ARRAY SUBSTRATE, DISPLAY PANEL AND DRIVING METHOD THEREOF

(71) Applicants: BOE TECHNOLOGY GROUP CO., LTD., Beijing (CN); CHONGQING BOE OPTOELECTRONICS TECHNOLOGY CO., LTD., Beibei, Chongqing (CN)

(72) Inventors: Zhuo Xu, Beijing (CN); Yajie Bai, Beijing (CN); Xing Xiong, Beijing (CN); Jaikwang Kim, Beijing (CN); Fei Shang, Beijing (CN); Wu Wang, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 221 days.

(21) Appl. No.: 15/502,674

(22) PCT Filed: Jul. 8, 2016

(86) PCT No.: PCT/CN2016/089404
§ 371 (c)(1),
(2) Date: Feb. 8, 2017

(87) PCT Pub. No.: WO2017/059711
PCT Pub. Date: Apr. 13, 2017

(65) Prior Publication Data
US 2017/0236474 A1 Aug. 17, 2017

(30) Foreign Application Priority Data
Oct. 10, 2015 (CN) .......................... 2015 1 0652613

(51) Int. Cl.
*G09G 3/36* (2006.01)
*G02F 1/1343* (2006.01)
(Continued)

(52) U.S. Cl.
CPC ......... *G09G 3/3614* (2013.01); *G02F 1/1368* (2013.01); *G02F 1/13624* (2013.01);
(Continued)

(58) Field of Classification Search
CPC ......... G09G 3/3614; G09G 2320/0204; G09G 2300/0465; G09G 2300/0823;
(Continued)

(56) References Cited

U.S. PATENT DOCUMENTS 6,714,206 B1  3/2004 Martin et al.
2010/0283803 A1* 11/2010 Chou .................. G02B 5/201
                                                   345/690
(Continued)

FOREIGN PATENT DOCUMENTS

CN    101881849 A    11/2010
CN    202285072 U    6/2012
(Continued)

OTHER PUBLICATIONS

International Search Report and Written Opinion dated Sep. 22, 2016; PCT/CN2016/089404.

*Primary Examiner* — Vinh T Lam
(74) *Attorney, Agent, or Firm* — Ladas & Parry LLP

(57) ABSTRACT

An array substrate, a display panel and a driving method thereof. The array substrate includes a plurality of right-angled triangular subpixels. Each subpixel and another adjacent subpixel form a corresponding rectangular virtual pixel, and the plurality of subpixels form a plurality of virtual pixels arranged in an array. Every four adjacent (Continued)

subpixels which belong to different virtual pixels respectively form a corresponding diamond-shaped physical pixel.

16 Claims, 8 Drawing Sheets

(51) Int. Cl.
  *G02F 1/1362* (2006.01)
  *G02F 1/1368* (2006.01)
(52) U.S. Cl.
  CPC .. *G02F 1/134309* (2013.01); *G02F 1/136286* (2013.01); *G02F 2001/134345* (2013.01); *G02F 2201/121* (2013.01); *G09G 3/3607* (2013.01); *G09G 2300/0465* (2013.01); *G09G 2300/0823* (2013.01); *G09G 2320/0204* (2013.01); *G09G 2330/021* (2013.01)
(58) Field of Classification Search
  CPC ............ G09G 3/3607; G09G 2330/021; G02F 1/134309; G02F 1/13624; G02F 1/136286; G02F 1/1368; G02F 1/1335; G02F 1/133; G02F 1/1362; G02F 2201/121

See application file for complete search history.

(56) References Cited

U.S. PATENT DOCUMENTS

| | | | |
|---|---|---|---|
| 2013/0077011 A1* | 3/2013 | Yamazaki | G02F 1/1368 349/43 |
| 2014/0015819 A1* | 1/2014 | Yamazaki | G09G 3/3614 345/209 |
| 2016/0070130 A1* | 3/2016 | Yuminami | G02F 1/13452 349/110 |
| 2016/0231605 A1* | 8/2016 | Yu | G02F 1/136286 |
| 2016/0370660 A1* | 12/2016 | Zhao | G02F 1/1333 |
| 2016/0370661 A1* | 12/2016 | Ono | G02F 1/134309 |

FOREIGN PATENT DOCUMENTS

| | | |
|---|---|---|
| CN | 102879965 A | 1/2013 |
| CN | 105137688 A | 12/2015 |
| CN | 105355643 A | 2/2016 |
| CN | 205028902 U | 2/2016 |

* cited by examiner

ARRAY SUBSTRATE, DISPLAY PANEL AND DRIVING METHOD THEREOF

TECHNICAL FIELD

Embodiments of the present disclosure relate to an array substrate, a display panel and a driving method thereof.

BACKGROUND

Currently, liquid crystal displays (LCDs) have gradually become an important part of today's consumer electronic products and are widely applied in display screens of devices such as mobile terminals provided with high-resolution color screens. Thin-film transistor liquid crystal displays (TFT-LCD) are one type of main LCDs. Each liquid crystal pixel dot of a TFT-LCD is driven by a thin-film transistor (TFT).

SUMMARY

Embodiments of the present disclosure provide an array substrate. The array substrate includes a plurality of right-angled triangular subpixels. Each subpixel and another adjacent subpixel form a corresponding rectangular virtual pixel, and the plurality of subpixels form a plurality of virtual pixels arranged in an array. Every four adjacent subpixels which belong to different virtual pixels respectively form a corresponding diamond-shaped physical pixel.

Embodiments of the present disclosure further provide a display panel, comprising any array substrate provided in embodiments of the disclosure.

Embodiments of the present disclosure further provide a driving method of the display panel. The driving method includes: applying signals with opposite polarities to each two adjacent columns of data lines in the display panel and applying a scanning signal to each gate line in sequence in a display time of each frame.

BRIEF DESCRIPTION OF THE DRAWINGS

In order to illustrate the technical solutions in the embodiments of the present disclosure or the existing arts more clearly, the drawings need to be used in the description of the embodiments or the existing arts will be briefly described in the following; it is obvious that the drawings described below are only related to some embodiments of the present disclosure, for one ordinary skilled person in the art, other drawings can be obtained according to these drawings.

DETAILED DESCRIPTION

Figure 1:
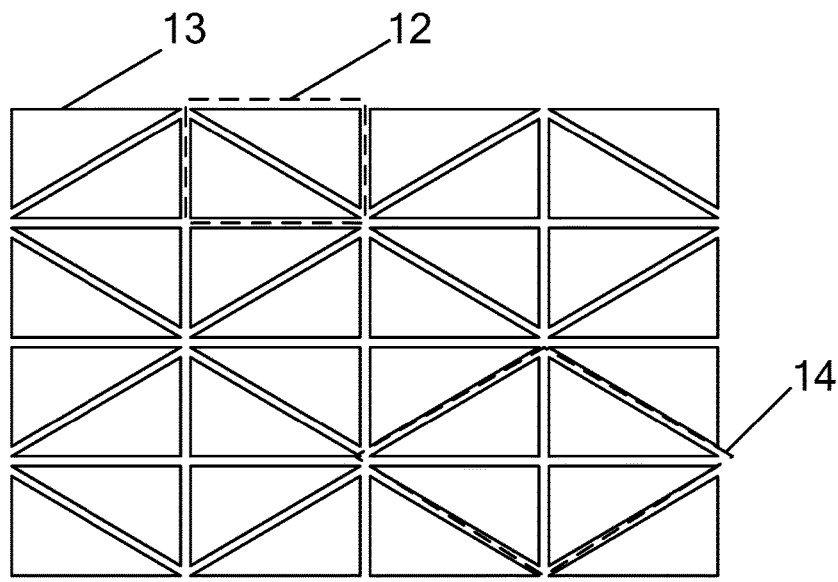
FIG. 1 is a schematic structural view of an array substrate provided by an embodiment of the present disclosure.

Hereafter, the technical solutions of the embodiments of the present disclosure will be described in a clearly and fully understandable way in connection with the drawings related to the embodiments of the disclosure. It is obvious that the described embodiments are just a part but not all of the embodiments of the present disclosure. Based on embodiments of the present disclosure, all other embodiments obtained by those skilled in the art without making other inventive work should be within the scope of the present disclosure.

In relevant technologies, each pixel in an LCD panel is provided with three subpixel units. When the dimension of each subpixel is (a long side):(a short side)=3:1, a ratio of a square pixel is guaranteed not to be misadjusted. Therefore, an aperture opening ratio of the display panel can be small. As the area of each pixel is formed by three subpixels, the area of each pixel can be large, and hence the display panel may be limited in achieving high resolution. Moreover, when the effect of dot inversion is achieved by column inversion, more wirings need to be added, and hence a transmission ratio of the display panel can be reduced.

In order to prevent the polarity of liquid crystal molecules in liquid crystal pixel dots from being subjected to direct current (DC) biasing and hence to be damaged, a display voltage at one end of the liquid crystal pixel dots may need to be changed constantly and to be higher or lower than a common electrode voltage (Vcom) at the other end. However, the voltage difference is kept unchanged, so that the polarity of each liquid crystal pixel dot changes continuously but the displayed gray scale is not changed. The polarity relationship of adjacent liquid crystal pixel dots determines the polarity inversion approach. The polarity inversion approach includes frame inversion, row inversion, column inversion and dot inversion. For instance, all the adjacent liquid crystal pixel dots in each image subjected to frame inversion have the same polarity; the characteristic of row inversion and column inversion is that the same row or column has the same polarity and adjacent rows or columns have an opposite polarity; and the characteristic of dot inversion is that each liquid crystal pixel dot has a polarity opposite to that of adjacent liquid crystal pixel dots. As the phenomenon such as flicker and crosstalk is rare in dot inversion and the display effect is optimum, dot inversion becomes a mainstream approach. However, under a same common electrode voltage, dot inversion has a largest variation frequency and variation voltage of output voltages of gate lines, and thus, a power consumption of dot inversion is largest compared with other polarity inversion approach.

From above, in a current display panel, when the area of the display panel is fixed, as the area of each pixel of the display panel is large, the resolution of the display panel can be limited; the aperture opening ratio of the display panel can be small; and the transmission ratio of the display panel can be reduced.

The embodiments of the present disclosure provide an array substrate, a display panel and a driving method thereof, which improve the resolution of the array substrate, increase the aperture opening ratio of the array substrate, and hence improve the transmission ratio of the array substrate.

It should be noted that Pentile display of the array substrate can be achieved when the structure of the array substrate provided by the embodiments of the present disclosure adopts the Pentile algorithm. Of course, an ordinary display may also be achieved when the Pentile algorithm is not adopted.

As illustrated in FIG. 1, an embodiment of the present disclosure provides an array substrate, which comprises right-angled triangular subpixels 13. Each subpixel can form a rectangular virtual pixel 12 together with another adjacent subpixel. A plurality of subpixels forms a plurality of virtual pixels arranged in an array. A diamond-shaped physical pixel 14 is formed by each four adjacent subpixels 13 which belong to different virtual pixels 12; that is, each subpixel 13 in the physical pixel 14 belongs to different virtual pixels 12 respectively.

It should be noted that each rectangular virtual pixel includes two right-angled triangular subpixels with an identical area, and Pentile display of the display panel can be achieved when the Pentile algorithm is adopted. A diamond-shaped physical pixel is formed by every four adjacent right-angled triangular subpixels which respectively belong to different virtual pixels 12, and the diamond shape of the physical pixel may be seen as an oblique rectangle. Therefore, both the shape of the physical pixel and the shape of the virtual pixel may be seen as a rectangular dimension, and so the pixel structure of the array substrate can be simultaneously compatible with ordinary display and virtual display. No matter whether the virtual pixels are adopted for high-resolution virtual drive display or the ordinary (physical) pixels are adopted for low-resolution ordinary display, images with high uniformity can be obtained, and hence good visual match effect can be achieved.

For instance, in an embodiment of the present disclosure, one virtual pixel is formed by two subpixels. As it is known that three colors can be combined to form all the colors and two colors cannot be combined to form all the colors, in actual display of images, a virtual pixel can borrow a subpixel of another color from another virtual pixel adjacent to the virtual pixel to form three colors. The borrowed subpixel may be a subpixel in an adjacent virtual pixel in the same row and may also be a subpixel in an adjacent virtual pixel in the same column according to the display driving approach. Based on this, in order to ensure that virtual display can be achieved, in general, two adjacent virtual pixels no matter that they are in the same row or in the same column are set to satisfy that the colors of subpixels included in the adjacent virtual pixels are different from each other. Each subpixel borrows a gray scale of an adjacent subpixel with a color that the subpixel lacks to achieve the gray-scale display of pixels needed to be displayed.

It should be noted that the shape of the subpixels in the embodiments of the present disclosure is not limited to the shape as shown in FIG. 1 and may also be a right-angled triangle in any shape, e.g., an isosceles right triangle or a non-isosceles right triangle. Of course, the shape of each subpixel may also be a pattern similar to a right-angled triangle. For instance, a maximal interior angle of the pattern of each subpixel is 89°, 85° or the like. Scenarios that one angle in the pattern is approximately a right angle also fall into the scope of the present disclosure.

In the array substrate provided by the embodiment of the present disclosure, as each virtual pixel is set to include two right-angled triangular subpixels with an equal area, the area of each pixel unit is reduced when compared with a pixel unit in the prior art under the same dimension of the display panel. Thus, the resolution of the array substrate can be improved. In addition, as each virtual pixel only includes two subpixels, the aperture opening ratio of the array substrate with the same panel dimension and the same resolution can be increased, and hence the transmission ratio of the array substrate can be improved. Moreover, as one diamond-shaped physical pixel is formed by every four adjacent subpixels, the effect of dot inversion can be achieved by adoption of column inversion to drive each virtual pixel, so that the logic power consumption of the array substrate can be reduced. Therefore, the array substrate provided by the embodiment of the present disclosure improves the resolution of the array substrate, increases the aperture opening ratio of the array substrate, achieves the effect of dot inversion by adoption of a column inversion driving approach, and reduces the logic power consumption of the array substrate.

Figure 2:
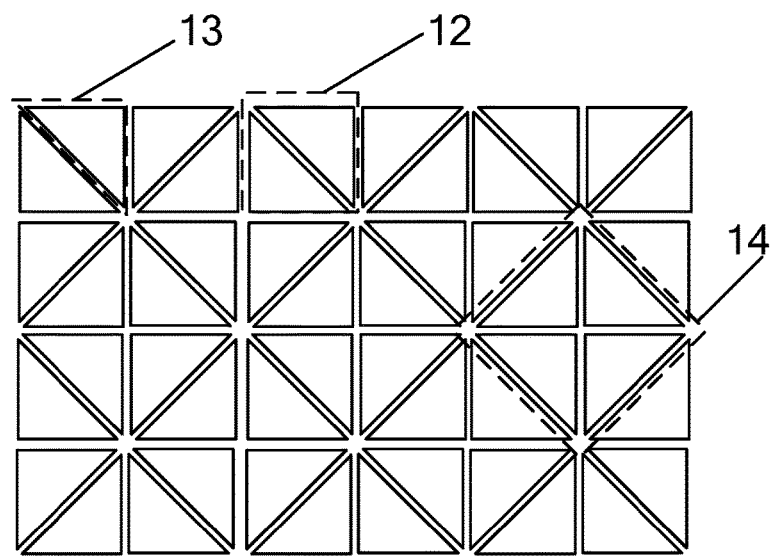
FIG. 2 is a schematic structural view of a second type of an array substrate provided by an embodiment of the present disclosure.

For instance, as illustrated in FIG. 2, the shape of each subpixel 13 is an isosceles right triangle.

In the embodiments of the present disclosure, each subpixel is a right-angled triangle, and every two subpixels form a rectangular virtual pixel. In order to achieve a better visual match effect, each subpixel may be designed to be an isosceles right triangle; each rectangular virtual pixel is a square; and each physical pixel is an oblique square, so that better visual effect can be achieved.

Figure 3:
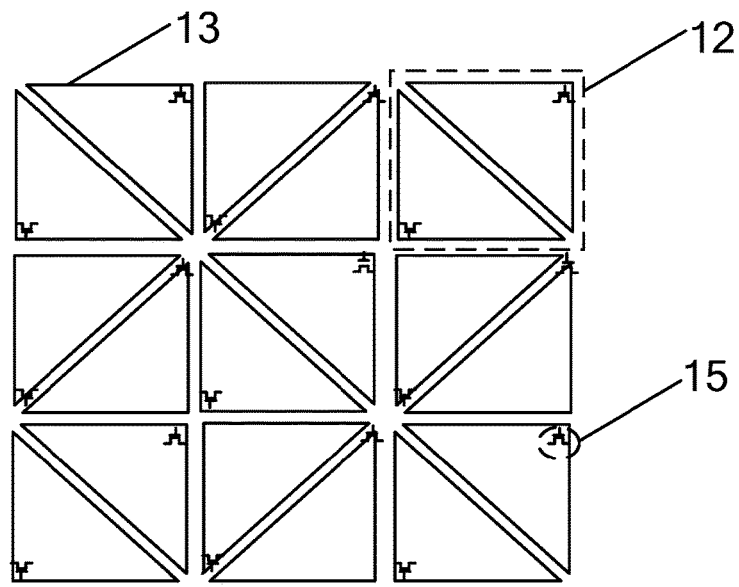
FIG. 3 is a schematic structural view of a third type of an array substrate provided by an embodiment of the present disclosure.

For instance, as illustrated in FIG. 3, each virtual pixel 12 includes two TFTs 15 (e.g., a first TFT and a second TFT), where each subpixel 13 includes one TFT 15, and the two TFTs are disposed at opposite angles of the same virtual pixel.

Figure 4:
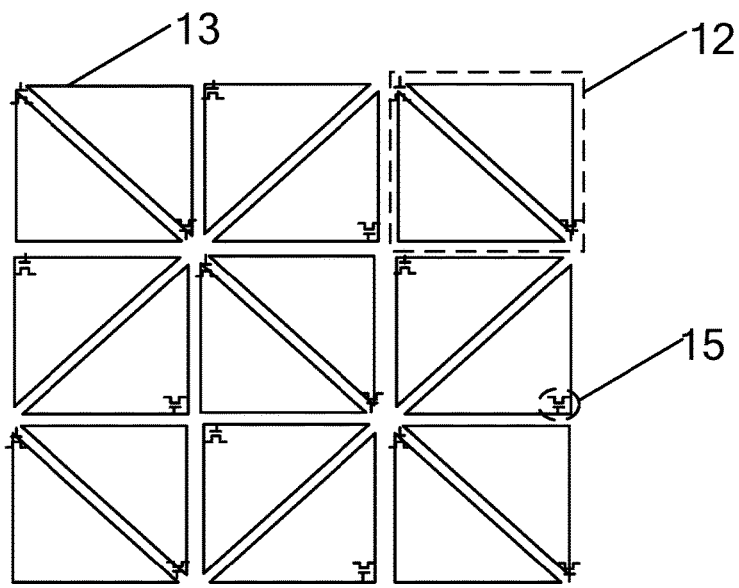
FIG. 4 is a schematic structural view of a fourth type of an array substrate provided by an embodiment of the present disclosure.

It should be noted that both the two TFTs in each virtual pixel are disposed at opposite angles of a rectangle formed by the virtual pixel. For instance, the two TFTs may be disposed in the lower-left and upper-right opposite-angle direction as shown in FIG. 3, and may also be disposed in the upper-left and lower-right opposite-angle direction as shown in FIG. 4. No specific limitation will be given in the present disclosure. In addition, placing positions of the two TFTs in each virtual pixel of the array substrate are all along the same opposite-angle direction.

Figure 5:
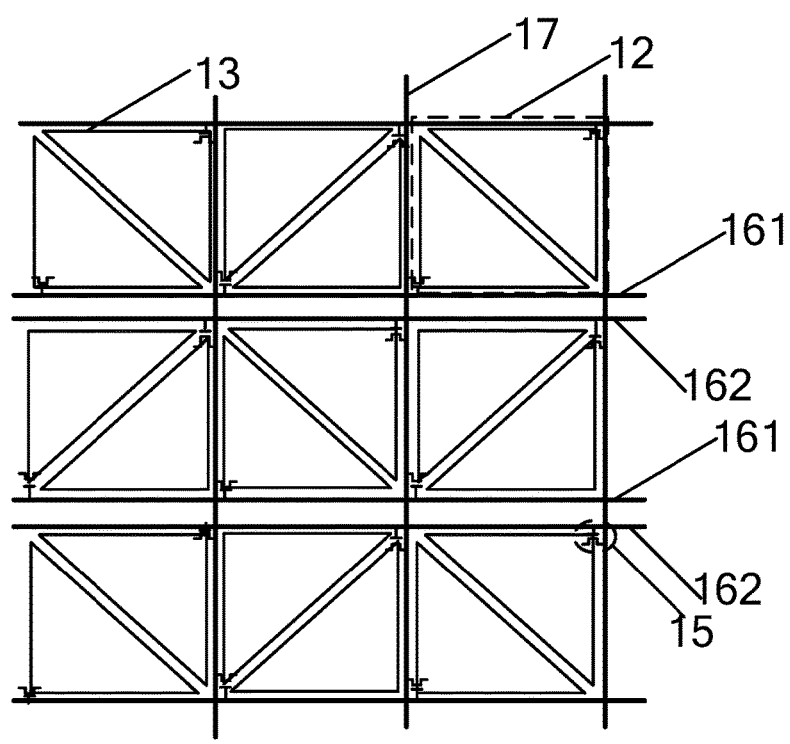
FIG. 5 is a schematic structural view of a fifth type of an array substrate provided by an embodiment of the present disclosure.

For instance, as illustrated in FIG. 5, the array substrate further comprises: two gate lines (a first gate line 161 and a second gate line 162 respectively) disposed between every two adjacent rows of virtual pixels 12, and one data line 17 disposed between every two adjacent columns of rectangular virtual pixels 12.

For instance, the first gate line 161 and each data line 17 are intercrossed at a corresponding first intercrossed position; a first TFT 15 disposed in a corresponding subpixel is arranged at each first intercrossed position; and a respective first TFT at each first intercrossed position is respectively connected with the first gate line 161 and the data line 17 at the first intercrossed position.

For instance, the second gate line 162 and each data line 17 are intercrossed at a corresponding second intercrossed position; a second TFT 16 disposed in a corresponding subpixel is arranged at each second intercrossed position; and a respective second TFT at each second intercrossed position is respectively connected with the second gate line 162 and the data line 17 at the second intercrossed position.

Moreover, the first TFT and the second TFT disposed in the same virtual pixel are arranged at opposite angles of the same virtual pixel. For instance, the first gate line 161 and the second gate line 162 are respectively intercrossed with and the same data line 17 at the first intercrossed position and the second intercrossed position; the two TFTs 15 disposed at the first intercrossed position and the second intercrossed position are arranged at the opposite angles of respective corresponding virtual pixels; and the arrangement approach of the two TFTs is identical.

For instance, two TFTs are respectively disposed at two intercrossed positions of each data line and two gate lines (the two TFTs are disposed on the two sides of the data line respectively), and the arrangement direction of the two TFTs is an oblique distribution direction. For instance, the two TFTs are respectively a first TFT and a second TFT; the first TFT is disposed on the left of the data line and at the intercrossed position of the first gate line and the data line, and is connected with the data line and the first gate line; and the second TFT is disposed on the right of the data line and at the intercrossed position of the second gate line and the data line, and is connected with the data line and the second gate line.

It should be noted that in the embodiments of the present disclosure, each virtual pixel includes two subpixels, and each of the two subpixels is connected to a different gate line through a different TFT. For instance, each virtual pixel includes a first subpixel and a second subpixel; the first subpixel is connected to the first gate line through the first TFT; and the second subpixel is connected to the second gate line through the second TFT.

Figure 6:
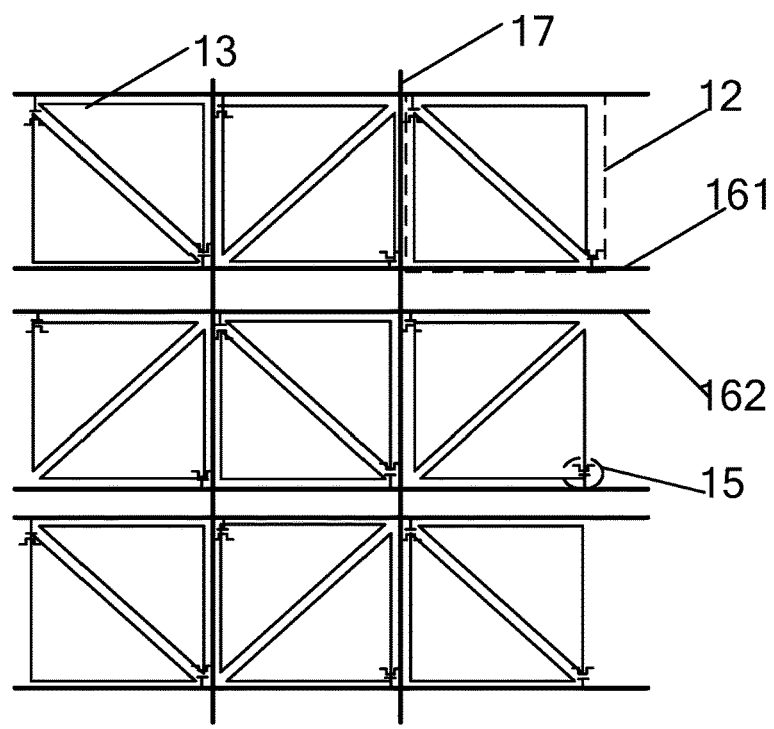
FIG. 6 is a schematic structural view of a sixth type of an array substrate provided by an embodiment of the present disclosure.

For instance, as illustrated in FIG. 5, the arrangement approach of the first TFT disposed at the intercrossed position of the first gate line 161 and the data line 17 and the second TFT disposed at the intercrossed position of the second gate lines and the data lines is along the lower-left and upper-right extension direction. Of course, as illustrated in FIG. 6, the arrangement approach of the two TFTs 15 may also be along the upper-left and lower-right extension direction. Only one TFT is disposed at the intercrossed position of each gate line and each data line.

It should be noted that a gate line of a TFT receives a scanning signal, so that the TFT can be switched on, and an image display signal on a data line is sent to a pixel electrode of a subpixel provided with the TFT for image display. Thus, a gate electrode of each TFT is connected with the first gate line or the second gate line; a source electrode of the TFT is connected with a data line adjacent to the TFT; and a drain electrode of the TFT is connected with the pixel electrode of the subpixel provided with the TFT.

Figure 7:
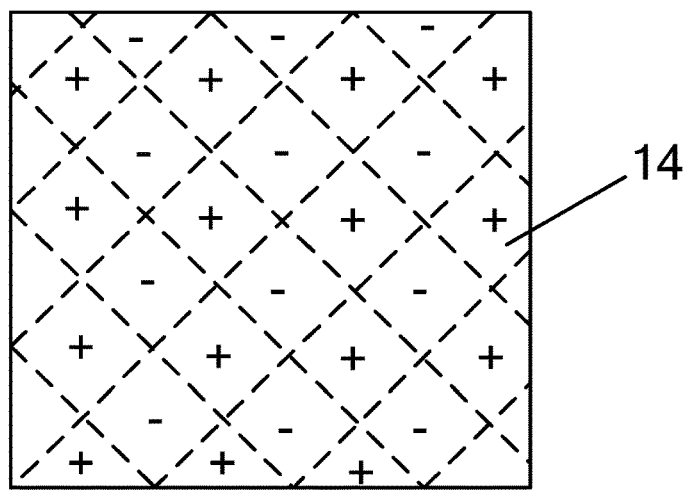
FIG. 7 is an illustration of dot inversion of an array substrate provided by an embodiment of the present disclosure.

FIG. 5 or 6 illustrates the connecting approach of the gate lines and the data lines in the array substrate provided by the embodiments of the present disclosure. When a general column driving method is adopted to scan each gate line of the display panel: in each physical pixel 14, a same data line is connected with each subpixel 13; however, data lines connected with each physical pixel and an adjacent physical pixel are different. As the voltages supplied by adjacent data lines have different polarities, the effect of dot inversion can be achieved by adoption of a column driving approach. FIG. 7 shows an effect of dot inversion.

Therefore, as one diamond-shaped physical pixel is formed by every four adjacent isosceles right triangle subpixels, the effect of dot inversion can be achieved by adoption of a column inversion driving approach to drive each isosceles right triangle subpixel, so that the logic power consumption of the array substrate can be reduced.

For instance, the array substrate further comprises: a common electrode line disposed between sloping sides of two subpixels in each virtual pixel.

As the common electrode line is disposed between the sloping sides of the two subpixels in each virtual pixel, the resistance of common electrodes can be reduced to prevent the display panel from being greenish. Meanwhile, the phenomenon such as crosstalk between the data lines and the common electrode lines can be avoided.

It should be noted that the common electrode lines may not be provided when the resistance of the common electrodes in the display panel has been very small; for instance, small-size display panels such as mobile displays may not be provided with common electrode lines. Supposing that the dimension of the display panel is 10 inches or more, the common electrode lines may be generally adopted to reduce the resistance; otherwise, the risk of being greenish can be increased.

For instance, the common electrode lines 18 disposed in the same column of virtual pixels 12 may be connected together, and the common electrode lines 18 may be arranged in the same layer as the source/drain electrodes of the TFTs 15.

Figure 9:
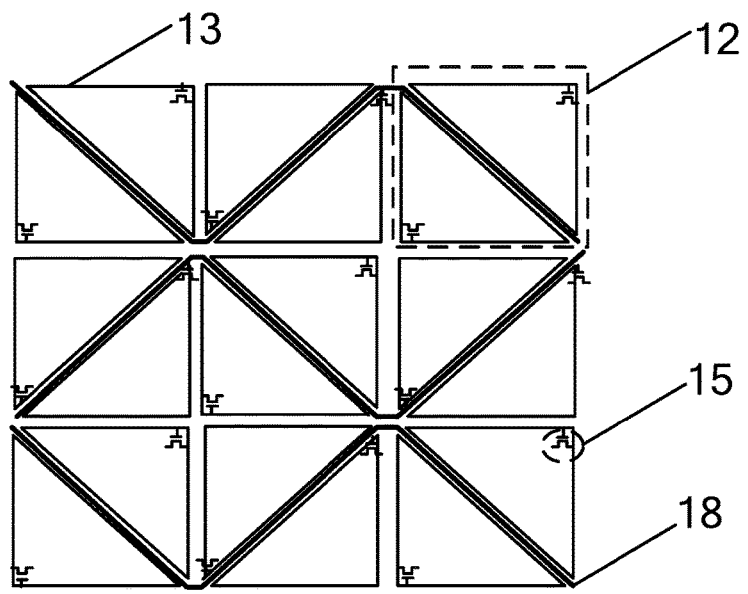
FIG. 9 is a schematic structural view of an eighth type of an array substrate provided by an embodiment of the present disclosure.

For instance, as illustrated in FIG. 9, the common electrode lines 18 disposed in the same row of virtual pixels 12 may be connected together, and the common electrode lines 18 may be arranged in the same layer as the gate electrodes of the TFTs 15.

Figure 10A:
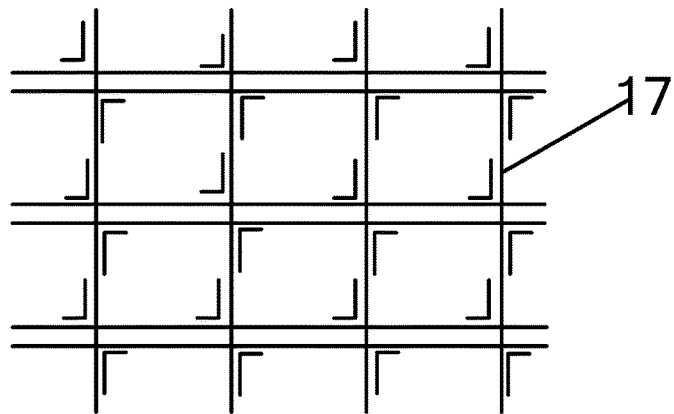
FIGS. 10(a) and 10(b) are respectively schematic structural views of a ninth type of an array substrate provided by an embodiment of the present disclosure.
Figure 10B:
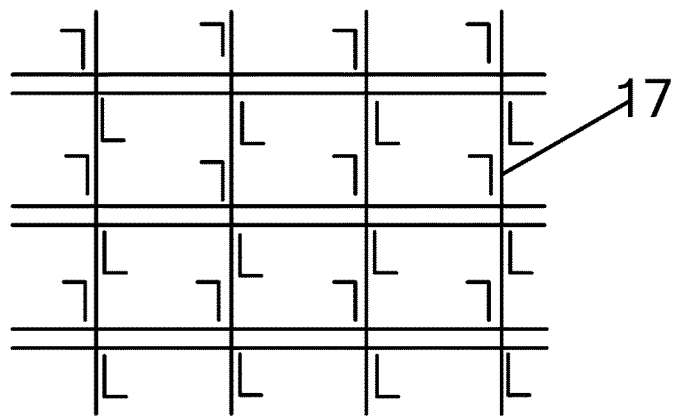
Figure 11A:
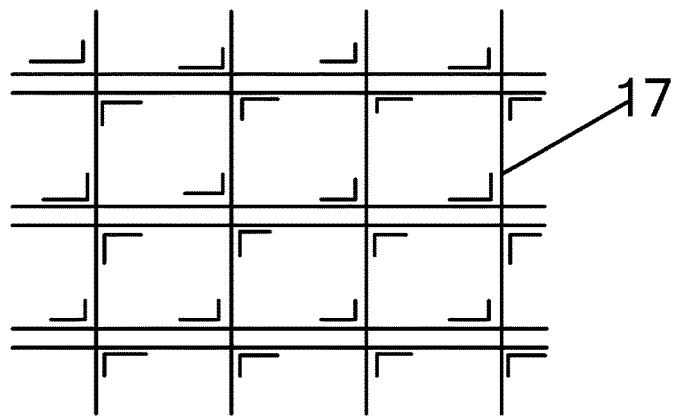
FIGS. 11(a) and 11(b) are respectively schematic structural views of a tenth type of an array substrate provided by the embodiment of the present disclosure.
Figure 11B:
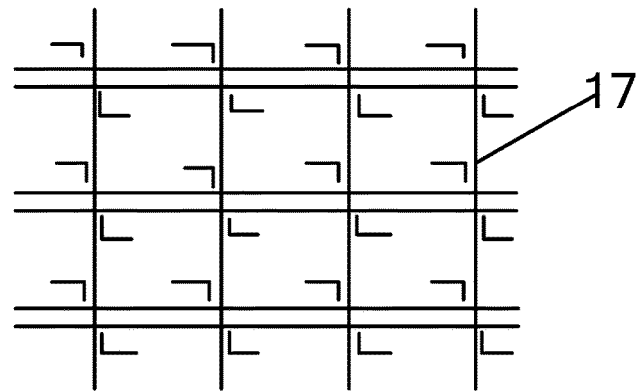

For instance, in the embodiments of the present disclosure, projections of channels of the TFTs on the array substrate are L-shaped. When the source/drain electrodes of the TFTs 15 are arranged in the same layer with the common electrode lines 18, as illustrated in FIGS. 10(*a*) and 10(*b*), a long side of the L shape is parallel to the data line 17 and a short side of the L shape is perpendicular to the data line 17. When the gate electrodes of the TFTs 15 are arranged in the same layer with the common electrode lines 18, as illustrated in FIGS. 11(*a*) and 11(*b*), the long side of the L shape is perpendicular to the data line 17 and the short side of the L shape is parallel to the data line 17.

In the embodiments of the present disclosure, as the projections of the channels of the TFTs on the array substrate are set to be L-shaped structures, the area of the TFTs can be reduced; a display area of the array substrate can be increased; and the aperture opening ratio of the array substrate can be increased. Moreover, when the projections of the channels of the TFTs on the array substrate are L-shaped structures, the placing approach of the long sides and the short sides of the L-shaped projections of the TFTs is not limited to the approach provided in the present disclosure. For instance, the short side may be set to be very short and even designed to be 0.

It should be noted that the case that the projections of the channels of the TFTs on the array substrate are L-shaped structures in the embodiments of the present disclosure is only taken as example embodiments. Of course, the projections of the channels of the TFTs on the array substrate may also be I-shaped structures, etc. No specific limitation will be given in the embodiments of the present disclosure.

Figure 8:
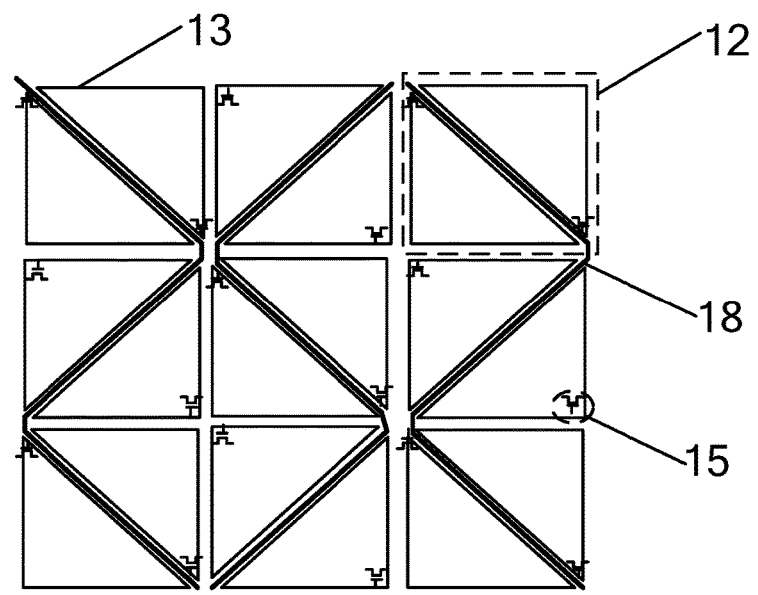
FIG. 8 is a schematic structural view of a seventh type of an array substrate provided by an embodiment of the present disclosure.

It should be noted that: when the TFTs are L-shaped structures and the common electrode lines disposed in the same column of virtual pixels are connected together, the two TFTs disposed at the opposite angles of the same virtual pixel are placed in the upper-left and lower-right direction (as shown in FIGS. 8 and 10(*a*)); and when the common electrode lines disposed in the same row of virtual pixels are connected together, the two TFTs disposed at the opposite angles of the same virtual pixel are placed in the lower-left and upper-right direction (as shown in FIG. 9).

For instance, a through hole is formed on a common electrode of at least one subpixel, and the common electrode line is connected with the common electrode of the subpixel via the through hole.

In order to reduce the resistance of the common electrodes, the common electrode lines may be set to be connected with the common electrodes, so that the common electrodes can be switched on. It should be noted that a through hole may also be formed on the common electrode of each subpixel, which is beneficial for reducing the resistance of the common electrodes. Of course, the through holes may be formed on some common electrodes, so that the density of the through holes can be reduced. For instance, one through hole is disposed on the common electrodes of every two subpixels, or one through hole is disposed on the common electrodes of every three subpixels. No specific limitation will be given on the density of the through holes in the present disclosure.

For instance, the common electrodes are slit electrodes or plate electrodes.

When the type of the display panel is different, the shape of the common electrodes is also different. No specific limitation will be given to the shape of the common electrodes in the embodiments of the present disclosure. When the common electrodes are slit electrodes, the common electrodes may be set to be one-domain structures with the same slit direction and may also be set to be two-domain structures with two different slit directions (for instance, in each virtual pixel, slits of a common electrode of one subpixel is tilted to the right at the angle of 5° and slits of a common electrode of the other subpixel is tilted to the left at the angle of 5°). For instance, when the subpixels in each virtual pixel adopt two-domain structures, the deflection direction of liquid crystals can be increased, so that the viewing angle of the display panel can be increased.

The array substrate provided by the present disclosure may be a one-domain structure or a two-domain pixel structure when adopting an in-plane switching (IPS) display mode, and may be a four-domain structure when adopting a vertical alignment (VA) display mode.

In summary, in the array substrate provided by the embodiments of the present disclosure, as each virtual pixel is set to include two right-angled triangular subpixels with an equal area, the area of each pixel unit is reduced when compared with a pixel unit in the prior art. Thus, the resolution of the array substrate can be improved. In addition, as each virtual pixel only includes two subpixels, the aperture opening ratio of the array substrate with the same panel dimension and the same resolution can be increased, and hence the transmission ratio of the array substrate can be improved. Moreover, as one diamond-shaped physical pixel is formed by every four adjacent subpixels, the effect of dot inversion can be achieved by adoption of column inversion to drive each virtual pixel, so that the logic power consumption of the array substrate can be reduced. Therefore, the array substrate provided by the embodiment of the present disclosure improves the resolution of the array substrate, increases the aperture opening ratio of the array substrate, achieves the effect of dot inversion by adoption of a column inversion driving approach, and reduces the logic power consumption of the array substrate.

An embodiment of the present disclosure provides a display panel, which comprises any array substrate provided by the embodiments of the present disclosure.

An embodiment of the present disclosure provides a driving method of the display panel provided by the present disclosure. The method comprises:

applying signals with opposite polarities to two adjacent columns of data lines in the display panel and applying a scanning signal to each gate line in sequence in the display time of each frame.

Figure 12:
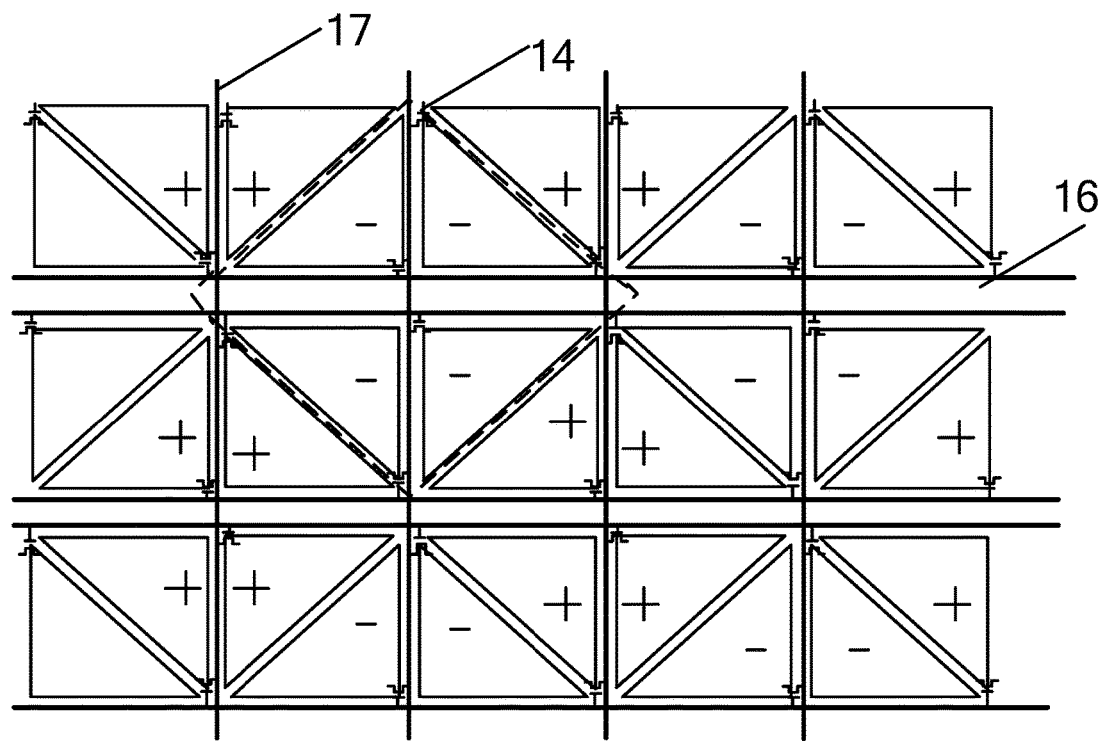
FIG. 12 is an illustration of a method for driving a display panel provided by an embodiment of the present disclosure.
Figure 13:
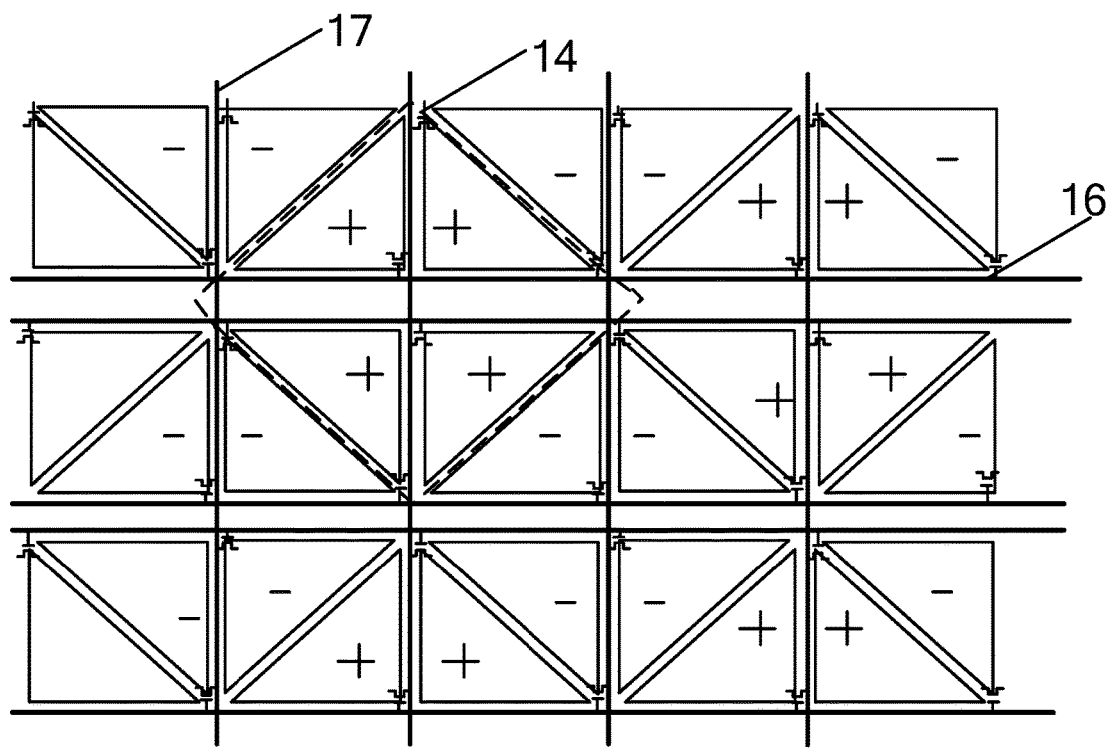
FIG. 13 is another illustration of a method for driving a display panel provided by an embodiment of the present disclosure.

In the display panel provided by the present disclosure, as illustrated in FIG. 12, in the display time of the first frame, a positive signal is inputted into the first data line 17; a negative signal is inputted into the second data line 17; a positive signal is inputted into the third data line 17; a negative signal is inputted into the fourth data line 17; similarly, positive and negative signals are inputted into every two adjacent data lines respectively. Meanwhile, a scanning signal is inputted into each gate line 16 in sequence. Thus, each diamond-shaped physical pixel 14 and its adjacent physical pixels 14 in the display panel can have opposite polarities. In the next frame, as illustrated in FIG. 13, a negative signal is inputted into the first data line 17; a positive signal is inputted into the second data line 17; a negative signal is inputted into the third data line 17; a positive signal is inputted into the fourth data line 17; similarly, positive and negative signals are inputted into every two adjacent data lines respectively. Meanwhile, the scanning signal is inputted into each gate line 16 in sequence. Thus, each diamond-shaped physical pixel 14 and its adjacent physical pixels in the display panel can have opposite polarities. As seen from the inversion effect of each physical pixel 14 shown in FIGS. 12 and 13, the driving method of the display panel provided by the present disclosure can achieve the effect of dot inversion by adoption of the column driving approach, so that the power consumption of the display panel can be reduced.

In summary, in the array substrate provided by the embodiments of the present disclosure, as each virtual pixel is set to include two right-angled triangular subpixels with an equal area, the area of each pixel unit is reduced when compared with a pixel unit in the prior art. Thus, the resolution of the array substrate can be improved. In addition, as each virtual pixel only includes two subpixels, the aperture opening ratio of the array substrate with the same panel dimension and the same resolution can be increased, and hence the transmission ratio of the array substrate can be improved. Moreover, as one diamond-shaped physical pixel is formed by every four adjacent subpixels, the effect of dot inversion can be achieved by adoption of column inversion to drive each virtual pixel, so that the logic power consumption of the array substrate can be reduced. Therefore, the array substrate provided by the embodiment of the present disclosure improves the resolution of the array substrate, increases the aperture opening ratio of the array substrate, achieves the effect of dot inversion by adoption of a column inversion driving approach, and reduces the logic power consumption of the array substrate.

It's to be noted that, in the drawings, for the clarity of the drawings the sizes of layers and areas may be exaggerated. And it can be understood, in the case that a component or a layer called "on" another element or layer, it can be directly on the top of the other elements, or can exist in the middle layer. Besides, it can be understood that, in the case that a component or a layer called "under" another element or layer, it can be directly under the other components, or there are at least two intermediate layers or elements. Besides, it can also be understood that, in the case that a layer or a component called "between" two layers or two elements, it can be the only layer of the two layers or two components, or it also exists at least two intermediate layers or elements. The similar reference marks indicate similar components in the whole text.

In the present disclosure, terms such as "first", "second" and the like used in the present disclosure do not indicate any sequence, quantity or significance but only for distinguishing different constituent parts. Also, the terms such as "a," "an," or "the" etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terns, but do not preclude the other elements or objects.

It is noted that, azimuth or positional relationships indicated by terms such as "up" and "down" and so on, are azimuth or positional relationships based on the drawings, which are only to facilitate description of the embodiments of the present disclosure and simplify the description, but not to indicate or imply that the devices or components must have a specific azimuth, or be constructed or operated in the specific azimuth, which thus cannot be understood as a limitation to the embodiments of the present disclosure. Unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. Those skilled in the art can understand the specific meanings of the above-mentioned terms in the embodiments of the present disclosure according to the specific circumstances.

Obviously, those skilled in the art may modify the disclosure in various ways without breaking away from the spirits and scope of the disclosure. And so, if these changes and variations of the disclosure also fall within the scope of the claims or their equivalent technologies, the disclosure intends to include these changes and variations.

The foregoing are merely specific embodiments of the disclosure, but not limitative to the protection scope of the disclosure. One skilled in the art could devise variations or replacements that within the scope and the spirit of the present disclosure, those variations or replacements shall belong to the protection scope of the disclosure. Thus, the protection scope of the disclosure shall be defined by the accompanying claims.

The present disclosure claims the benefits of Chinese patent application No. 201510652613.8, which was filed with the SIPO on Oct. 10, 2015 and is incorporated herein in its entirety by reference as part of this application.

What is claimed is:

1. An array substrate, comprising:
a plurality of right-angled triangular subpixels, wherein:
each right-angled triangular subpixel and another right-angled triangular adjacent subpixel form a corresponding rectangular virtual pixel, the plurality of right-angled triangular subpixels form a plurality of virtual pixels arranged in an array;
every four adjacent right-angled triangular subpixels which belong to different virtual pixels respectively form a corresponding diamond-shaped physical pixel; and
a data line disposed between every two adjacent columns of virtual pixels, and four adjacent right-angled triangular subpixels of each diamond-shaped physical pixel connect to a same one data line.

2. The array substrate according to claim 1, wherein each right-angled triangular subpixel has a shape of an isosceles right triangle.

3. The array substrate according to claim 2, wherein each virtual pixel includes two thin-film transistors (TFTs), each right-angled triangular subpixel of the virtual pixel includes one TFT, and the two TFTs are disposed at opposite angles of a rectangle formed by the virtual pixel.

4. The array substrate according to claim 3, further comprising:
a first gate line and a second gate line disposed between every two adjacent rows of virtual pixels, wherein:
the first gate line and each data line are intercrossed at a respective first intercrossed position; a first TFT disposed in a corresponding right-angled triangular subpixel is arranged at the respective first intercrossed position; the first TFT is respectively connected with the first gate line and a data line at the respective first intercrossed position;
the second gate line and each data line are intercrossed at a respective second intercrossed position; a second TFT disposed in a corresponding right-angled triangular subpixel is arranged at the respective second intercrossed position; the second TFT is respectively connected with the second gate line and a data line at the respective second intercrossed position; and
the first TFT and the second TFT disposed in a same virtual pixel are arranged at opposite angles of the same virtual pixel.

5. The array substrate according to claim 4, further comprising: a common electrode line disposed between sloping sides of two right-angled triangular subpixels in each virtual pixel.

6. The array substrate according to claim 5, wherein common electrode lines disposed in a same column of virtual pixels are connected together.

7. The array substrate according to claim 6, wherein the common electrode lines are arranged in the same layer with source electrodes and drain electrodes of the first TFT and the second TFT.

8. The array substrate according to claim 7, wherein both a projection of a channel of the first TFT and a projection of a channel of the second TFT on the array substrate have an L shape, a long side of the L shape is parallel to the data line, and a short side of the L shape is perpendicular to the data line.

9. The array substrate according to claim 5, wherein common electrode lines disposed in a same row of virtual pixels are connected together.

10. The array substrate according to claim 9, wherein the common electrode lines are arranged in the same layer with gate electrodes of the first TFT and the second TFT.

11. The array substrate according to claim 10, wherein a projection of a channel of the first TFT and a projection of a channel of the second TFT on the array substrate have an L shape, a long side of the L shape is perpendicular to the data line, and a short side of the L shape is parallel to the data line.

12. The array substrate according to claim 5, wherein a through hole is formed on a common electrode of at least one right-angled triangular subpixel, and the common electrode line is connected with a common electrode of the right-angled triangular subpixel via the through hole.

13. The array substrate according to claim 12, wherein the common electrode is a slit electrode or a plate electrode.

14. A display panel, comprising the array substrate according to claim 1.

15. A driving method of the display panel which comprises an array substrate, wherein the array substrate comprises:
a plurality of right-angled triangular subpixels, wherein:
each right-angled triangular subpixel and another right-angled triangular adjacent subpixel form a corresponding rectangular virtual pixel, the plurality of right-angled triangular subpixels form a plurality of virtual pixels arranged in an array;
every four adjacent right-angled triangular subpixels which belong to different virtual pixels respectively form a corresponding diamond-shaped physical pixel;
a data line disposed between every two adjacent columns of virtual pixels, and four adjacent right-angled triangular subpixels of each diamond-shaped physical pixel connect to a same one data line; and
the driving method comprising:
applying signals with opposite polarities to each two adjacent columns of data lines in the display panel and applying a scanning signal to each gate line in sequence in a display time of each frame.

16. The array substrate according to claim 1, wherein two diamond-shaped physical pixels which are adjacent to each other along a direction perpendicular to an extension direction of the data lines connect to different data lines.

* * * * *